Nov. 24, 1931.   E. K. STANDISH   1,833,475
VARIABLE SPEED TRANSMISSION
Filed Oct. 29, 1930   3 Sheets-Sheet 1

INVENTOR.
Edward K. Standish
BY Harry R. Williams
ATTORNEY.

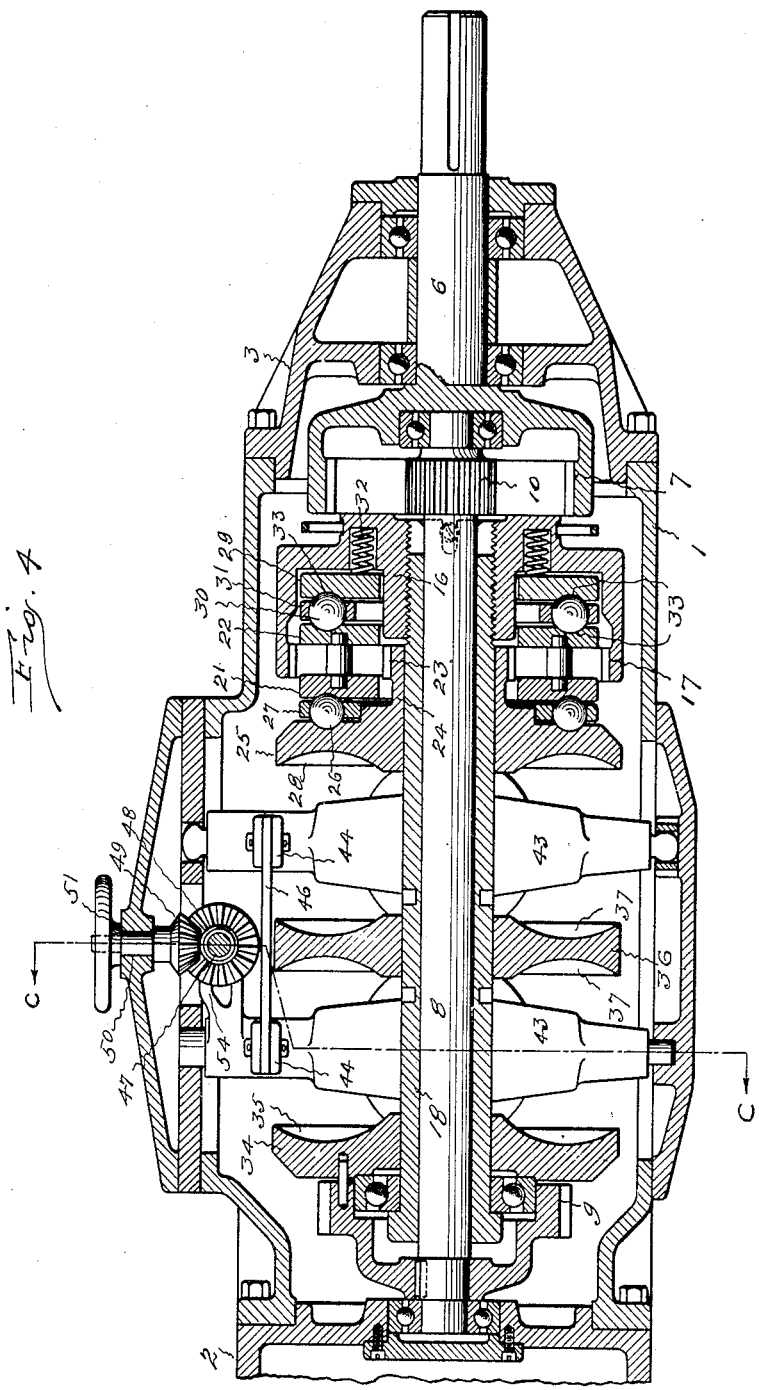

Patented Nov. 24, 1931

1,833,475

UNITED STATES PATENT OFFICE

EDWARD K. STANDISH, OF STOUGHTON, MASSACHUSETTS, ASSIGNOR TO THE HARTFORD SPECIAL MACHINERY COMPANY, OF HARTFORD, CONNECTICUT, A CORPORATION OF CONNECTICUT

VARIABLE SPEED TRANSMISSION

Application filed October 29, 1930. Serial No. 491,945.

This invention relates to a variable speed transmission of the type in which the changes of speed are obtained through the medium of frictionally engaged rolls and disks.

The object of the invention is to provide a compact mechanism of this character which is economical to manufacture, which will transmit power efficiently without noise or vibration, which is capable of slight variations but has a wide range of increase and decrease of output speed, which may be instantly altered while in operation, which is entirely enclosed so that it will be protected from dirt and can be thoroughly lubricated, and in which the driving pressures of the engaging surfaces increase with the load.

In the embodiment of the invention illustrated there is a tubular casing with an axially extending shaft that is driven through reduction gears by a motor attached to a head fastened to one end of the casing. Attached to the other end of the casing is a head which supports a shaft that is driven by planetary gearing. Between the motor driven reduction gears and the planetary gearing are friction disks engaged by friction rolls, the angularity of the axes of which rolls may be varied by means operable from the outside of the casing. The frictional engagement between the rolls and disks is affected by thrust bearings which have a slight axial movement and which have cam means so arranged that the pressure between the disks and rolls increases according to the load resistance.

Figure 1:
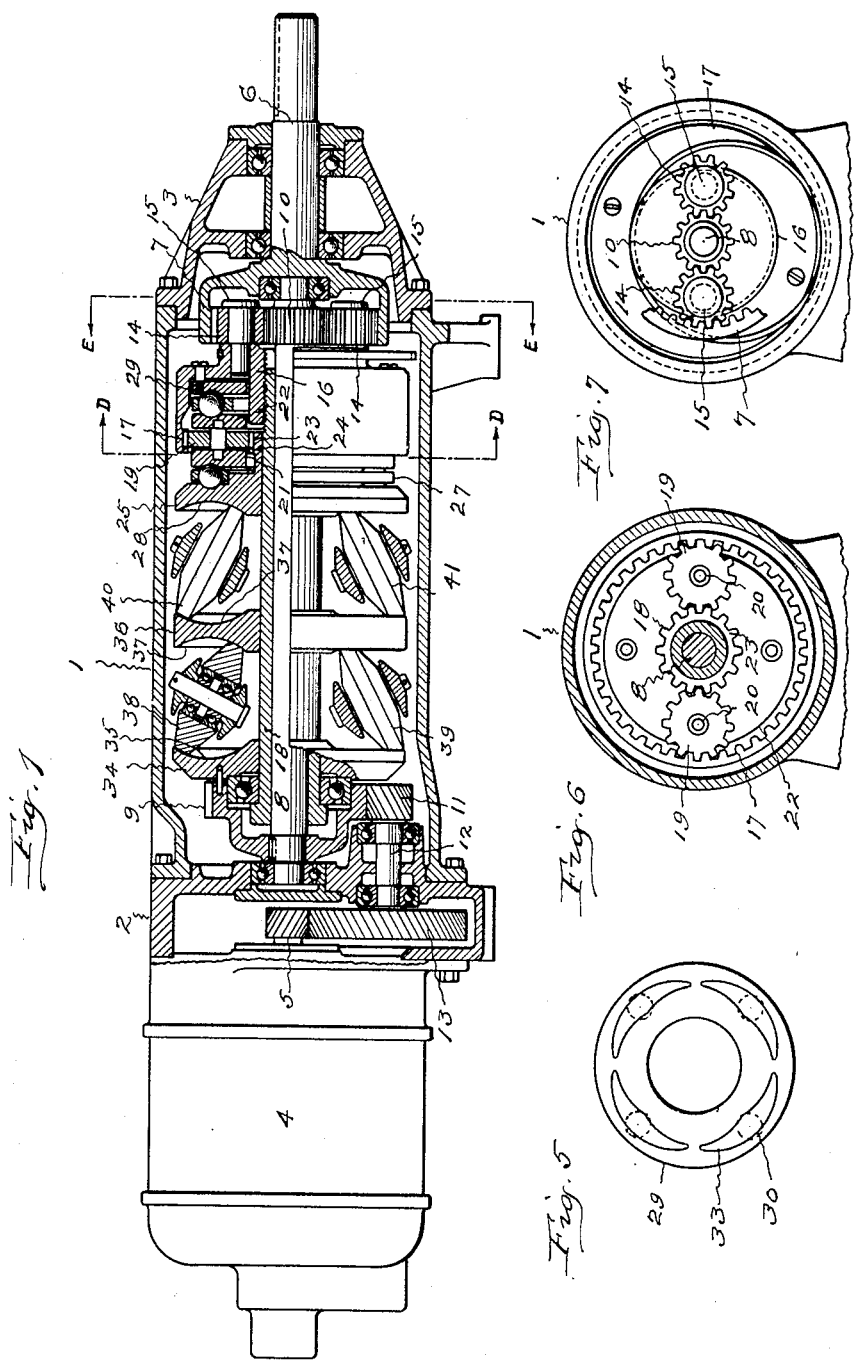
Figure 2:
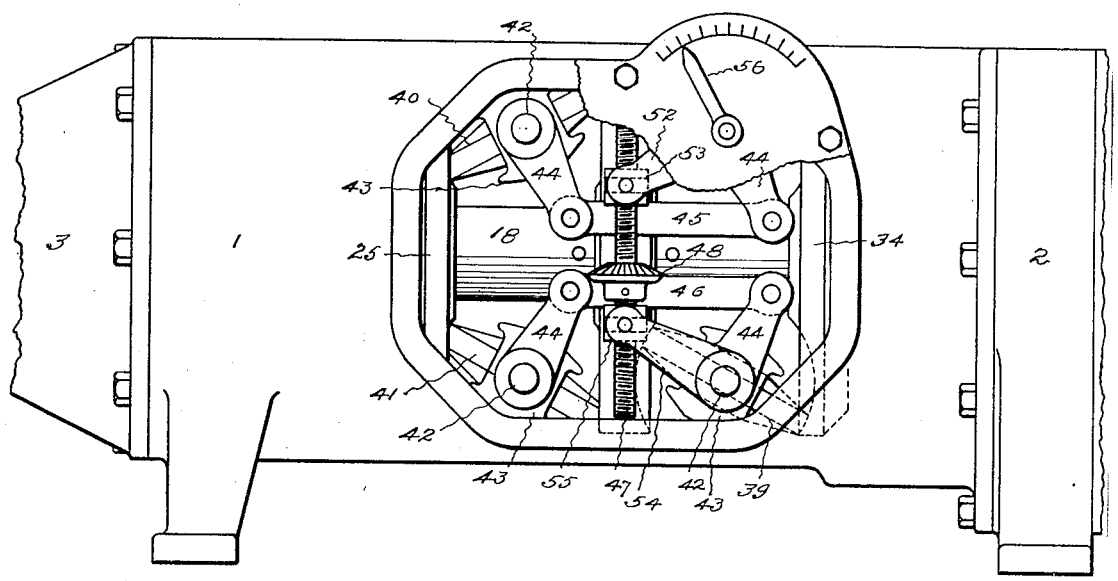
Figure 3:
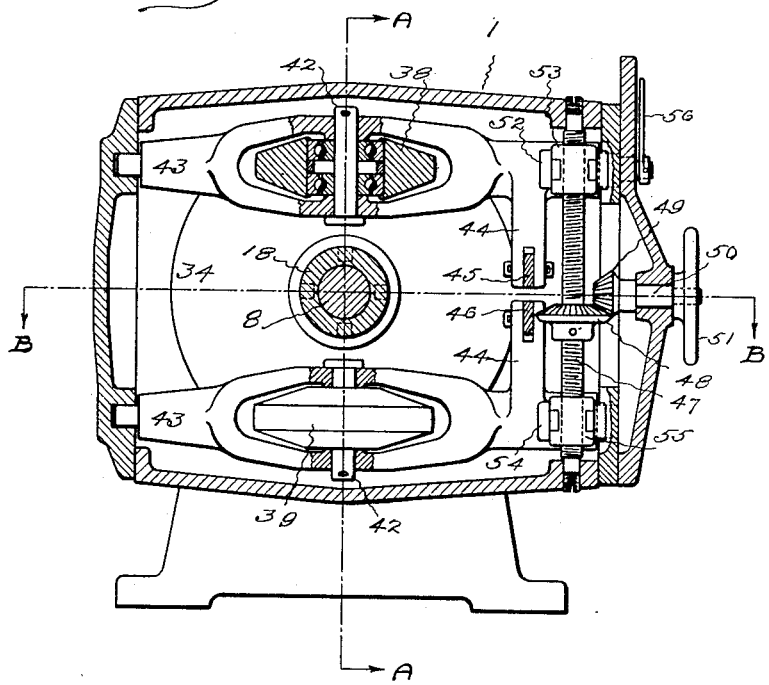

In the accompanying drawings Fig. 1 is a side view of the transmission with a part in longitudinal section on the plane indicated by the dotted line A—A on Fig. 3. Fig. 2 is a side view on larger scale with the cover plate broken away. Fig. 3 is a transverse section on the dotted line C—C on Fig. 4. Fig. 4 is a longitudinal section on the plane indicated by the dotted line B—B on Fig. 3. Fig. 5 is a view of one of the thrust bearing plates. Fig. 6 is a transverse section on the dotted line D—D on Fig. 1. Fig. 7 is a transverse section on the dotted line E—E on Fig. 1.

The casing 1 at one end has a head 2 and at the other end has a head 3. The operating motor 4 with a driving pinion 5, is fastened to the head 2, and the driven shaft 6 with an internal gear 7, is supported by bearings in the head 3. Extending longitudinally of the casing with one end supported by bearings in the head 2 and the other end supported by bearings in the gear 7 is a shaft 8. Fastened to the shaft 8 adjacent to the head 2 is a gear 9 and adjacent to the gear 7 is a gear 10. Meshing with the gear 9 is a pinion 11 on an arbor 12 that has a gear 13 which is engaged by the driving pinion 5. Meshing with the gear 10 are pinions 14 that also engage with the gear 7. The pinions 14 turn on studs 15 that are set in the hub 16 of an internal gear 17. The hub 16 of the gear 17 is fastened to a sleeve 18 that is rotatably fitted on the shaft 8.

Meshing with the internal gear 17 are pinions 19 that are rotatable on studs 20 mounted in thrust bearing rings 21 and 22. The pinions 19 also engage with a gear 23 on the hub 24 of a friction disk 25 that is free to turn on, and have an axial movement along the sleeve 18. Between the ring 21 and the back face of the disk 25 are bearing balls 26 retained by an annular cage 27. The front face of the disk 25 has an annular concave channel 28. Between the ring 22 and an annular plate 29 are bearing balls 30 retained by an annular cage 31. The annular plate 29 is rotatably connected with the gear 17 but is free to be thrust toward the ring 22 by springs 32, and the ball grooves 33 in the face of the plate 29 and ring 22 are cam shaped or tapered in both directions, as shown in Fig. 5. When the mechanism is idle the balls occupy neutral positions, but when running under load the balls tend to ride toward the ends of the grooves and thus force apart the ring and plate.

Turning loosely on the sleeve 18 and pinned to the gear 9 is a friction disk 34, the face of which has an annular concave channel 35. Turning loosely on and having axial movement along the sleeve 18, between the friction disk 34 and the friction disk 25, is a friction disk 36. Each face of this disk 36 has an annular concave channel 37, Fig. 4.

Engaging with the curved walls of the channels in the faces of the disks 34 and 36 are the peripheries of rolls 38 and 39, and engaging with the curved walls of the channels in the faces of the disks 36 and 25 are the peripheries of rolls 40 and 41. Each of these rolls is rotatably mounted on a stud 42 that extends across the opening in a yoke 43 that is pivotally supported by the casing with its axis concentric with the center of the arcs of the channel walls with which the roll engages. Each of the yokes has a rocker arm 44 that projects at right angles to its axis. The arms of the yokes carrying the rolls 38 and 40 are connected by a link 45, and the arms of the yokes carrying the rolls 39 and 41 are connected by a link 46.

Extending vertically near one side of the casing is a spindle 47 provided with right and left threads, Figs. 2, 3. Fastened to this spindle is a bevel gear 48 that is engaged by a bevel gear 49 on an arbor 50 that extends through the side of the casing and on the outside is provided with a hand wheel 51. Projecting from the axis of the yoke bearing the roll 38 is an arm 52 with a forked end that engages with a nut 53 on the spindle, and projecting from the axis of the yoke bearing the wheel 39 is an arm 54 with a forked end that engages a nut 55 on the spindle. By turning the hand wheel the angularity of the diameters of the friction rolls may be adjusted radially of the surfaces of the friction disks to obtain the desired relative speeds of the disks. This adjustment is indicated by the pointer 56 on the end of one of the roll carrying yokes.

With this organization the shaft 8 is rotated at a speed reduced from the speed of the motor by the pinion 5, gear 13, pinion 11 and gear 9. The gear 9 drives the friction disk 34 which through the rolls 38 and 39 drives the friction disk 36 that through the rolls 40 and 41 drives the friction disk 25 at a speed depending upon the angular relation of the rolls to the disks. The disk 25 through the gear 23, and planetary pinions 19, rotates the gear 17, these parts becoming locked together by the action of the balls 30 in the cam grooves 33 in the ring 22 and plate 29. And the gear 17 through the pinions 14 which engage with the gear 10 on the shaft 8 and with the gear 7, rotates the driven shaft 6 at a further reduction of speed. Thus the velocity of the driven shaft 6 is determined by the driving speed of the planetary gearing which is controlled by the angularity of the friction rolls with relation to the friction disks. The springs 32 between a wall of the gear 17 and the thrust plate 29 affect the initial frictional pressure between the friction rolls and friction disks, and the cam shaped ball grooves 33 in the plate 29 and ring 22, increase this pressure as the load resistance increases. This transmission will run in either direction by reversing the motor rotation.

This transmission will run in either direction by reversing the motor. While the organization illustrated as embodying the invention is described as a speed reduction unit, it is obvious that it may be arranged and used for increasing speed. By shifting the rolls to neutral points on the disks the driven shaft may be made to stand still, and by further shifting rolls the rotation of the driven shaft may be reversed, without change of direction of rotation of the driving motor.

The invention claimed is:—

1. A variable speed mechanism comprising a driving shaft having a spur gear near each end, a driven shaft having an internal gear complementary to the gear at one end of the driving shaft, planetary gears meshing with said internal gear and complementary spur gear, an internal spur gear carrying said planetary gears, a plurality of friction discs and friction rolls adjustably engaged therewith, driven from the gear at the other end of the driving shaft, a spur gear rotated by one of the friction discs, and planetary gears meshing with the second mentioned internal spur gear and the last mentioned spur gear, whereby the driving shaft rotates the driven shaft through the medium of planetary gears the speeds of which are controlled by the adjusted relations of the friction rolls to the friction discs which are also driven by the driving shaft.

2. A variable speed mechanism comprising a driving shaft having a spur gear near each end, a driven shaft having an internal gear complementary to the gear at one end of the driving shaft, planetary gears meshing with said internal gear and complementary spur gear, an internal spur gear carrying said planetary gears, a sleeve rotatable on the driving shaft, a plurality of friction discs rotatable on and movable longitudinally of said sleeve, friction rolls adjustably engaged with said discs, said discs and rolls being driven from the gear at the other end of the driving shaft, a spur gear rotated by one of the friction discs, planetary gears meshing with the second mentioned internal spur gear and the last mentioned spur gear, annular plates with facing cam grooves arranged between said second mentioned internal gear and a friction disc, and balls located in said cam grooves and adapted to separate said plates and increase the frictional engagement of the rolls and discs according to the load on the mechanism.

EDWARD K. STANDISH.